United States Patent
Haidak et al.

(10) Patent No.: US 9,381,964 B2
(45) Date of Patent: Jul. 5, 2016

(54) SYSTEM AND METHOD FOR BIKE LOCKING

(71) Applicant: Bikeep OÜ, Tallinn (EE)

(72) Inventors: Meelis Haidak, Kõo Vald (EE); Kustas Kõiv, Saku (EE); Ott Reinhold, Tallinn (EE)

(73) Assignee: BIKEEP OU, Tallinn (EE)

( * ) Notice: Subject to any disclaimer, the term of this patent is extended or adjusted under 35 U.S.C. 154(b) by 30 days.

(21) Appl. No.: 14/508,176

(22) Filed: Oct. 7, 2014

(65) Prior Publication Data

US 2015/0096335 A1    Apr. 9, 2015

Related U.S. Application Data

(60) Provisional application No. 61/887,550, filed on Oct. 7, 2013.

(51) Int. Cl.
*B62J 3/00* (2006.01)
*B62H 5/20* (2006.01)
*E05B 71/00* (2006.01)
*B62H 3/02* (2006.01)

(52) U.S. Cl.
CPC .. *B62H 5/20* (2013.01); *B62H 3/02* (2013.01); *E05B 71/00* (2013.01); *Y10T 70/5004* (2015.04)

(58) Field of Classification Search
CPC ............ B62H 3/02; B62H 5/20; E05B 71/00
USPC .............. 370/432; 70/57.1; 340/432
See application file for complete search history.

(56) References Cited

U.S. PATENT DOCUMENTS

| | | | | |
|---|---|---|---|---|
| 3,827,773 A | * | 8/1974 | Aiello | B62H 5/08 70/234 |
| 4,080,020 A | * | 3/1978 | Candelaria | B62H 5/00 70/234 |
| 5,323,915 A | * | 6/1994 | Fortune, Sr. | B62H 3/00 70/62 |
| 5,841,351 A | * | 11/1998 | Rey | B62H 5/00 340/572.1 |
| 6,384,717 B1 | * | 5/2002 | DeVolpi | B62H 3/02 340/568.1 |
| 7,571,628 B2 | | 8/2009 | D Anieri | |
| 8,065,895 B2 | | 11/2011 | Andersen | |
| 8,508,333 B2 | | 8/2013 | Kanof | |
| 8,854,207 B2 | * | 10/2014 | Williams | E05B 73/0011 340/539.13 |
| 9,199,681 B2 | * | 12/2015 | Gonzalez Hernandez | B62H 3/08 |
| 2007/0107322 A1 | * | 5/2007 | Blume | B62H 3/04 52/79.4 |
| 2010/0228405 A1 | * | 9/2010 | Morgal | B62H 3/02 701/2 |
| 2011/0307394 A1 | * | 12/2011 | Rzepecki | G06Q 30/00 705/307 |
| 2012/0196631 A1 | * | 8/2012 | Fajstrup Axelsen | G06Q 20/32 340/5.5 |
| 2013/0150028 A1 | * | 6/2013 | Akins | G04W 4/02 455/427 |
| 2013/0338865 A1 | * | 12/2013 | Kryze | B60L 11/1851 701/22 |

FOREIGN PATENT DOCUMENTS

DE    19623924 A1    12/1997

* cited by examiner

*Primary Examiner* — Eric M Blount

(74) *Attorney, Agent, or Firm* — Berggren Inc.

(57) ABSTRACT

Provided is a secure and easy to use solution for bike holders to securely lock all kinds of bicycles with different frames and shapes without the need to carry a personal lock. The present system and method for bike locking securely locks the bike's frame and wheel.

15 Claims, 8 Drawing Sheets

SYSTEM AND METHOD FOR BIKE LOCKING

PRIORITY

This application claims priority of U.S. provisional application No. 61/887,550 filed on Oct. 7, 2013, the contents of which are incorporated herein by reference in entirety.

FIELD OF THE INVENTION

The present invention relates to secure parking, locking, charging solutions for bicycles, bikes, electric scooters and other vehicles.

BACKGROUND OF THE INVENTION

Typical bike locks (chains, cables, U-locks, etc.) are small, not secure and are easily breakable. Known solutions, e.g. bike rental systems, provide onsite locking for specially constructed bicycles and these are not suitable for personal bicycles.

There are also known several public stands and locking systems. For example patent documents U.S. Pat. Nos. 8,508,333, 7,571,628, DE19623924A1, and U.S. Pat. No. 8,065,895 describe different locking systems, but these solutions are not secure enough, not suitable for use of different types of bicycles. All known bicycles locking systems are complicated to use, in a case of bicycle theft attempt, the known solutions does not provide additional security means to prevent the attack.

There are no secure solutions for parking and surveillance of bicycles while owners are shopping, at the movies or working. Bike users have to carry their own locks, which still do not secure the bike against theft. There is currently no solution for onsite bike locking that securely fixes and locks different types of bicycle's frame and wheel and as an addition provides an opportunity to use a locker for personal belongings.

There are also several other problems with current bicycles locking systems. For example in crowded public areas all bike racks or stands are occupied and the users are not able to find a free space where to lock their bikes. Known solutions do not provide charging opportunities to charge electric bikes, scooters or personal electronic devices. If the users have locked their bikes then it is not possible to share their bikes with other users.

SUMMARY OF THE INVENTION

The aim of the present invention is to provide a secure and easy to use solution for bike holders to securely lock all kinds of bicycles with different frames and shapes without the need to carry a personal lock. The present system and method for bike locking securely locks the bike's frame and wheel.

Security module comprises alarm system, sound and lighting means to indicate a free spot for the bike and security means (e.g. video camera, alarm system, etc.). Locked bikes are secured 24 h including 24 h support and a parking network map, 24 h call and action support.

The security of the bike is ensured by a steel bar, which is locked by cell (for example via SMS or phone call) or mobile device (e.g. smart phone, tablet, wearable, etc.) for example via mobile application or other contact free (e.g. RFID, QR, NFC) application, web application or manual dock ID input.

The minimalist design of the present invention makes it suitable to place the bike locking system in front of any building, which is a sign of ecological footprint and gives a peace of mind to the visitors who come by bike.

The present invention enables to check the availability of free locking space and book it in advance. The present system and method for bike locking makes it possible to share the bike with other users (e.g. friends, family, colleagues, etc.). The present system comprises charging module to charge electric bikes, scooters and electronic devices; information board; outdoor screen for advertisements; roof, solar panels as a power source.

A system for bike locking is provided comprising: a main unit; at least one docking unit; a server; a local station server; and at least one user identification means; wherein the local station server is connected to the server and at least one docking unit, and the main unit comprises a first power unit, a main controller, a first communication unit, and a security means, wherein the docking unit comprises a housing, a locking module, a second power unit, a charger module, a microcontroller, a second communication module, alarm means, and communication means, wherein the microcontroller is connected to the alarm means and the locking module and the locking module comprises a locker, a locker door, a fixing lever, a bearing and a lock with electronic drive for the fixing lever and the locker door; and wherein the second communication module is connected to the microcontroller, the first communication unit, the alarm means and the communication means connected to the microcontroller; wherein the first power unit is connected to the main controller, to the security means and to the second power unit, the first communication unit is connected to the main controller, to the security means, to the second communication unit and over a wired or wireless network with the server; wherein the second power unit is connected to the first power unit, to the microcontroller and to the charging module, and the second communication unit is connected to the first communication unit, to the microcontroller and to the communication means.

BRIEF DESCRIPTION OF THE DRAWINGS

The preferred embodiment of present invention is explained more precisely with references to figures added, where.

DETAILED DESCRIPTION OF THE INVENTION

Figure 1:
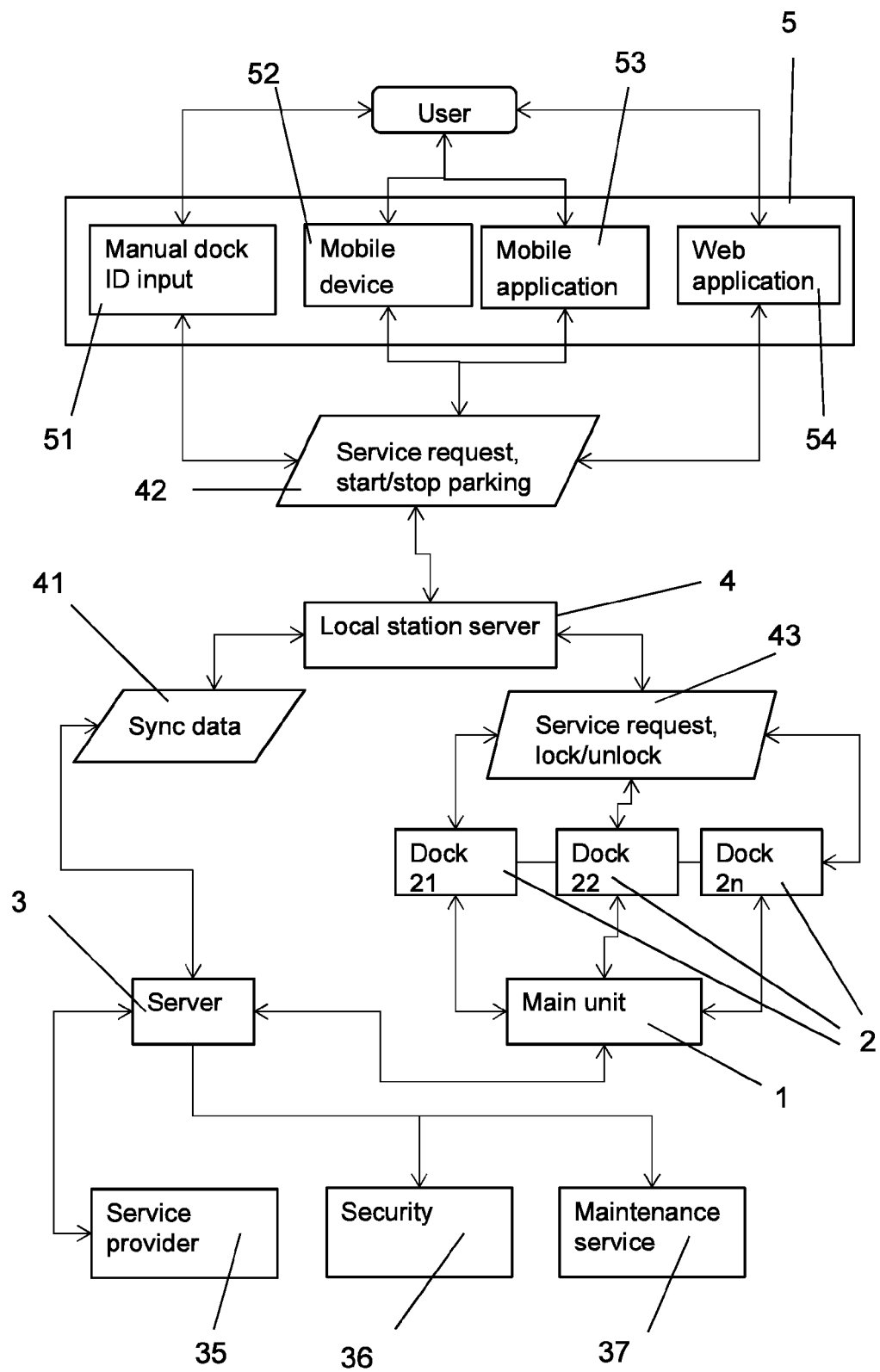
FIG. 1 is a block diagram of the present invention.

The present invention provides a secure bike locking system and method. Referring to FIG. 1, the system for bike locking according to present invention comprises a main unit 1, at least one docking unit 2, a server 3, a local station server 4, at least one user identification means 5, wherein the local station server 4 is connected via data sync 41 to the server 3 and via a service request 42 to at least one user identification means 5 (for example manual dock ID input 51, mobile device 52, mobile application 53 and/or web application 54)

and via service request 43 to at least one docking unit 2. The server 3 is connected to the main unit 1 and to service provider 35 (for example bike repair, bike remove, bike relocate and/or other bike related services), security provider 36, and maintenance service 37.

Figure 2:
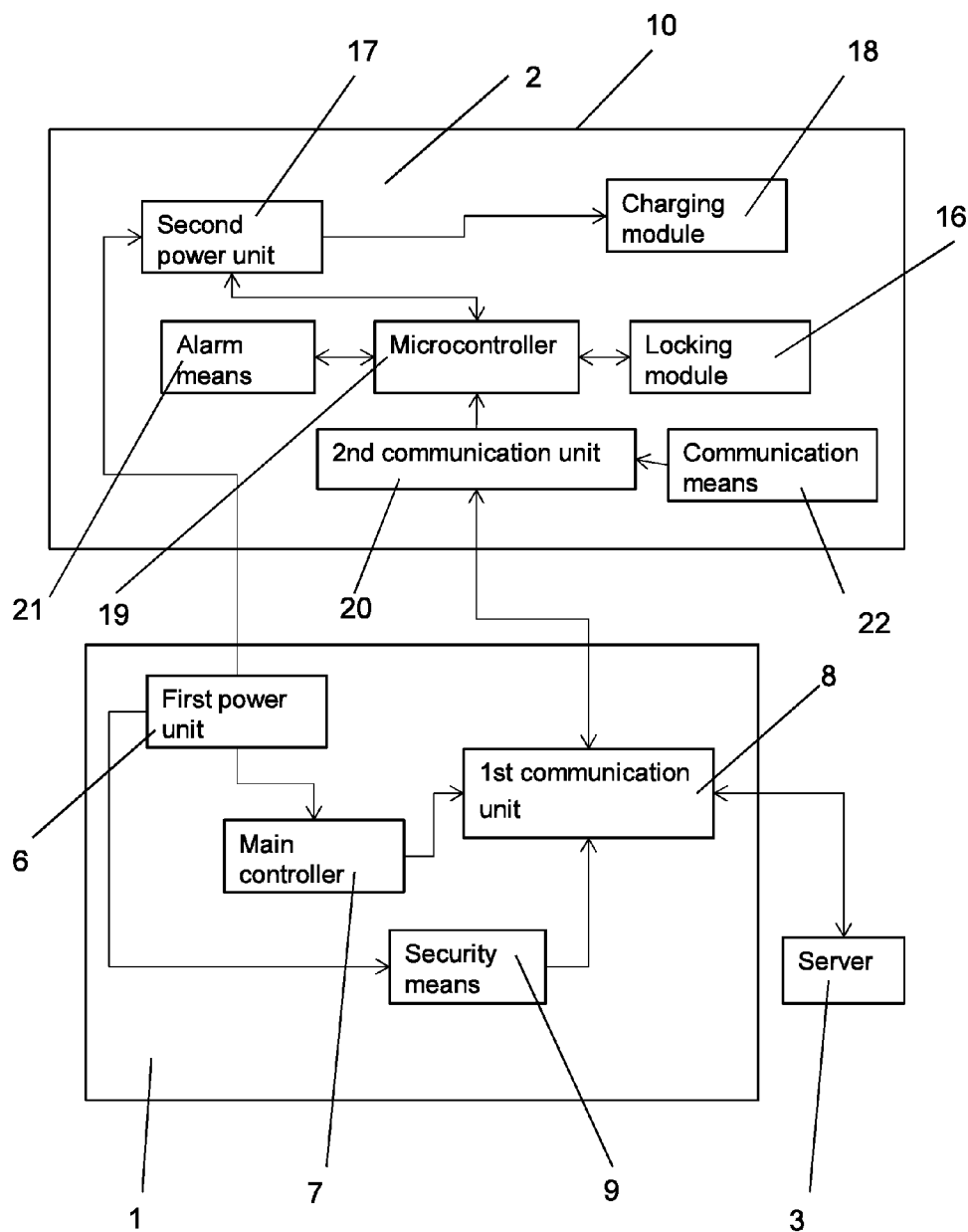
FIG. 2 is a block diagram of the components of the docking unit and the main unit.
Figure 3:
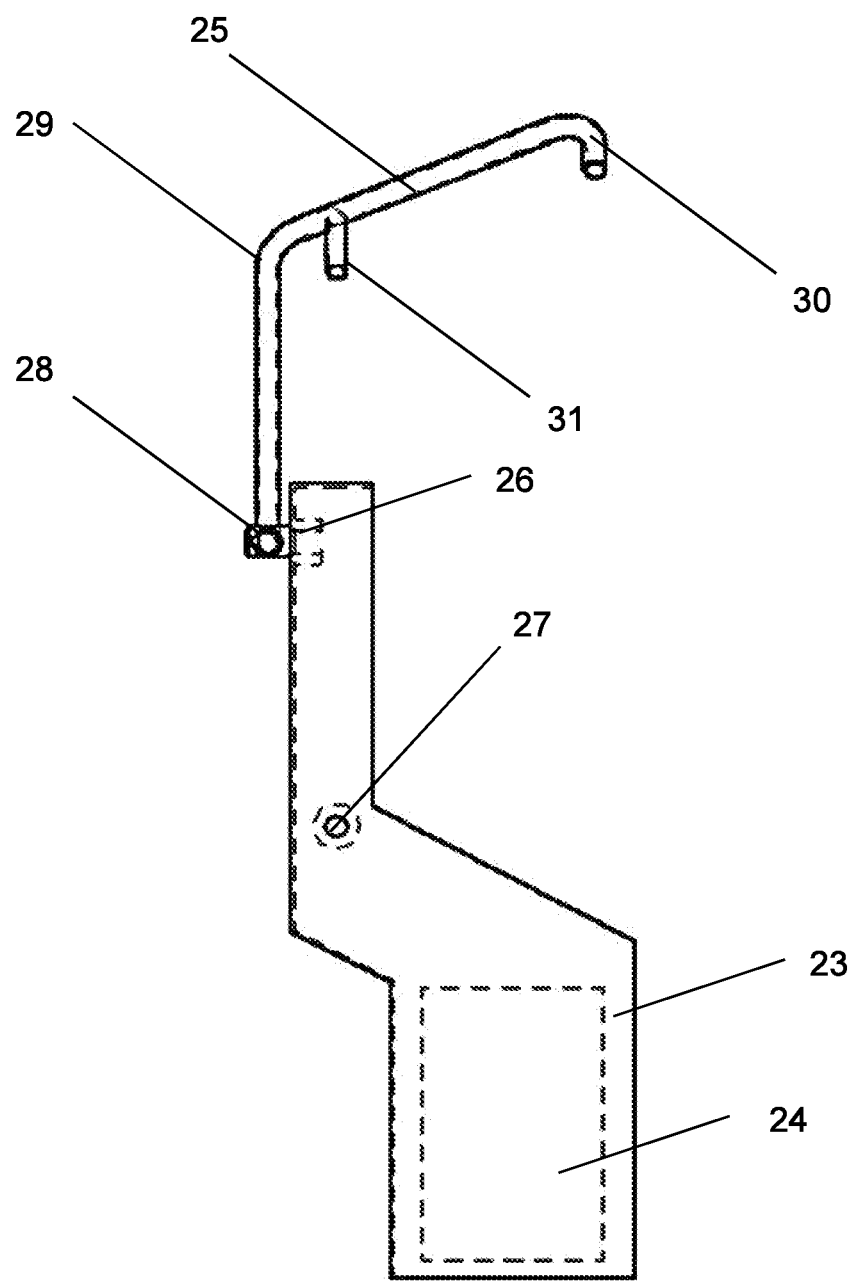
FIG. 3 is a side view of the docking unit in opened position.
Figure 4:
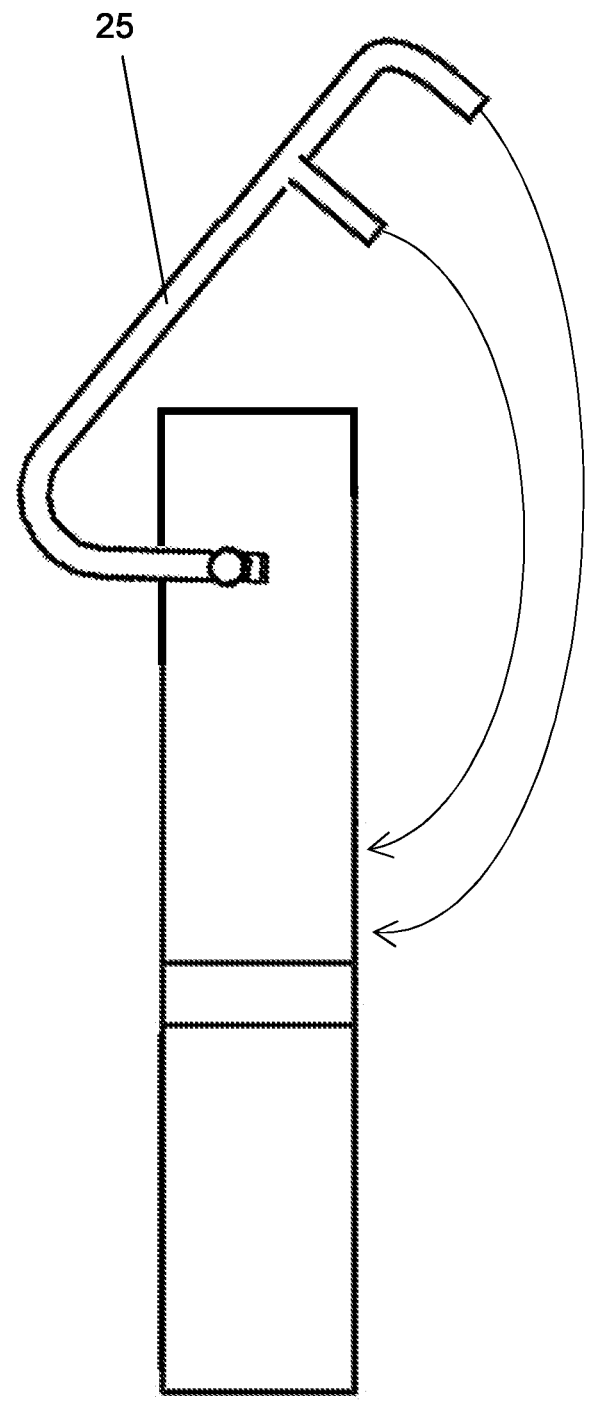
FIG. 4 is a front view of the docking unit in opened position showing the movement direction of fixing lever.
Figure 5:
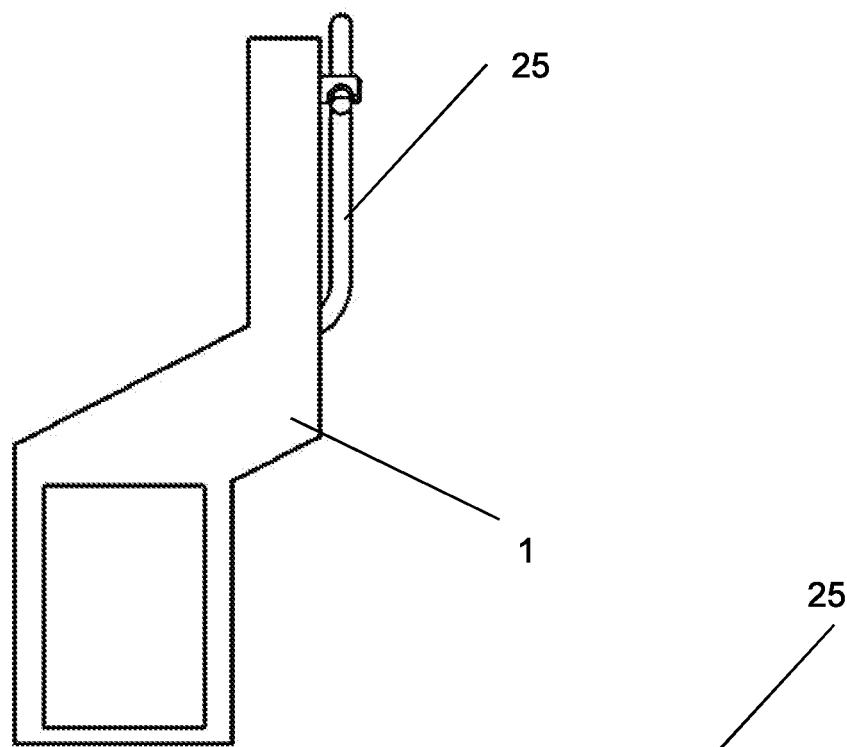
FIG. 5 is a side view of the docking unit in closed position.
Figure 6:
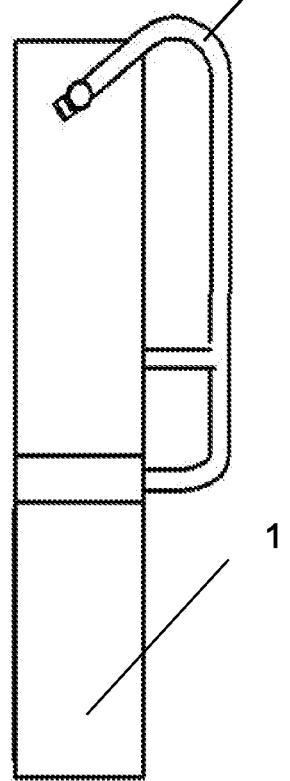
FIG. 6 is a front view of the docking unit closed position.
Figure 7:
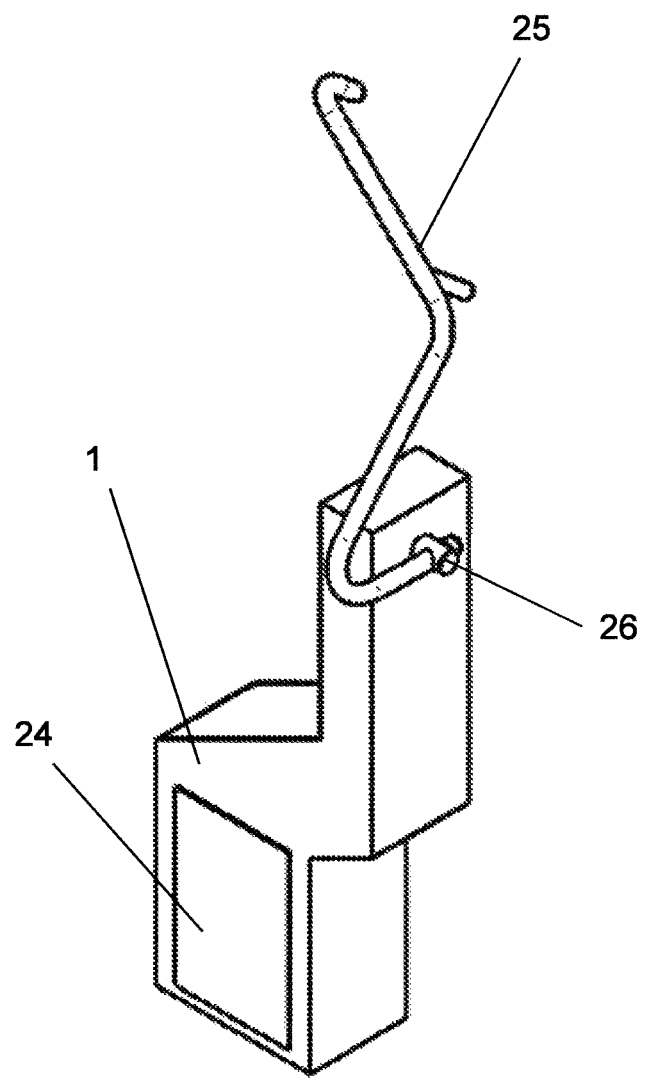
FIG. 7 is a perspective view of the docking unit in open position.

Referring to FIG. 2, the main unit 1 comprises a first power unit 6 connected to a main controller 7, which is connected to a first communication unit 8 and security means 9 which is connected to the first communication unit 8 (for example wireless (2G connection, 3G connection, Bluetooth) and/or wired connection) and to the first power unit 6.

The docking unit 2 comprises a housing 10, a locking module 16 for a locker door 24 and a fixing lever 25. The locking module 16 is connected to a microcontroller 19. The docking unit further comprises a second power unit 17 connected to the microcontroller 19, a charger module 18 for charging electric vehicles (for example electric bicycles, scooters, cars, wheelchairs, etc.) and electronic devices (for example mobile devices, laptops, USB powered devices) and to the first power unit. The docking unit also comprises a second communication module 20 (for example wireless (2G connection, 3G connection, Bluetooth) and/or wired connection) connected to the microcontroller 19 and to the first communication unit 8; alarm means 21 and communication means 22 (for example RFID, NFC card readers, finger print readers, serial communication read e.g. for detecting and communicating with smart bike) both connected to the microcontroller 19.

The first power unit 6 is connected to the main controller 7, to security means (for example camera, piezo sound alarm, SMS notifications for related personnel, cover/case open/close detection, vibration sensors, dampening sensors) 9 and to the second power unit 1. The first communication unit 8 is connected to the main controller 7, to the security means 9, to the second communication unit 20 and over a wired or wireless network with the server 3. The first power unit 6 comprises for example battery, solar panel and/or 110-230V AC connection(s).

The second power unit 17 is converting voltage step down or step up depending on charging module or any other connected device needs and is connected to the first power unit 6, to the microcontroller 19 and to the charging module 18. The second communication unit 20 is connected to the first communication unit 8, to the microcontroller 19 and to the communication means 22. The microcontroller 19 is connected to the alarm means 21 and to the locking module 16.

Referring to FIGS. 3 to 7, the locking module 16 comprises a locker 23, a locker door 24, a fixing lever 25, a bearing 26 and a lock 27 with electronic drive for the fixing lever 25 and the locker door 24. The alarm means 21 comprises for example alarm sensors, sound and light indicators to indicate a free spot for the bike and buzzer or loudspeaker for alarm.

The fixing lever 25 comprises a bended first part 28, a second part 29, an end part 30 and a mounting part 31. The first part 28, the second part 29 and the end part 30 are bended so that the fixing lever 25 forms an angle of rotation approximately 120-140 degrees, preferably 130 degrees. In closed position the mounting part 31 is switched into lock 27.

User identification means 5 comprises for example touch pad, touch screen, billing means, cell phone and/or smartphone compatibility, mobile application and/or web application compatibility.

Communication unit 22 comprises for example RFID, NFC, QR or other contactless data communication or identification means.

Figure 8:
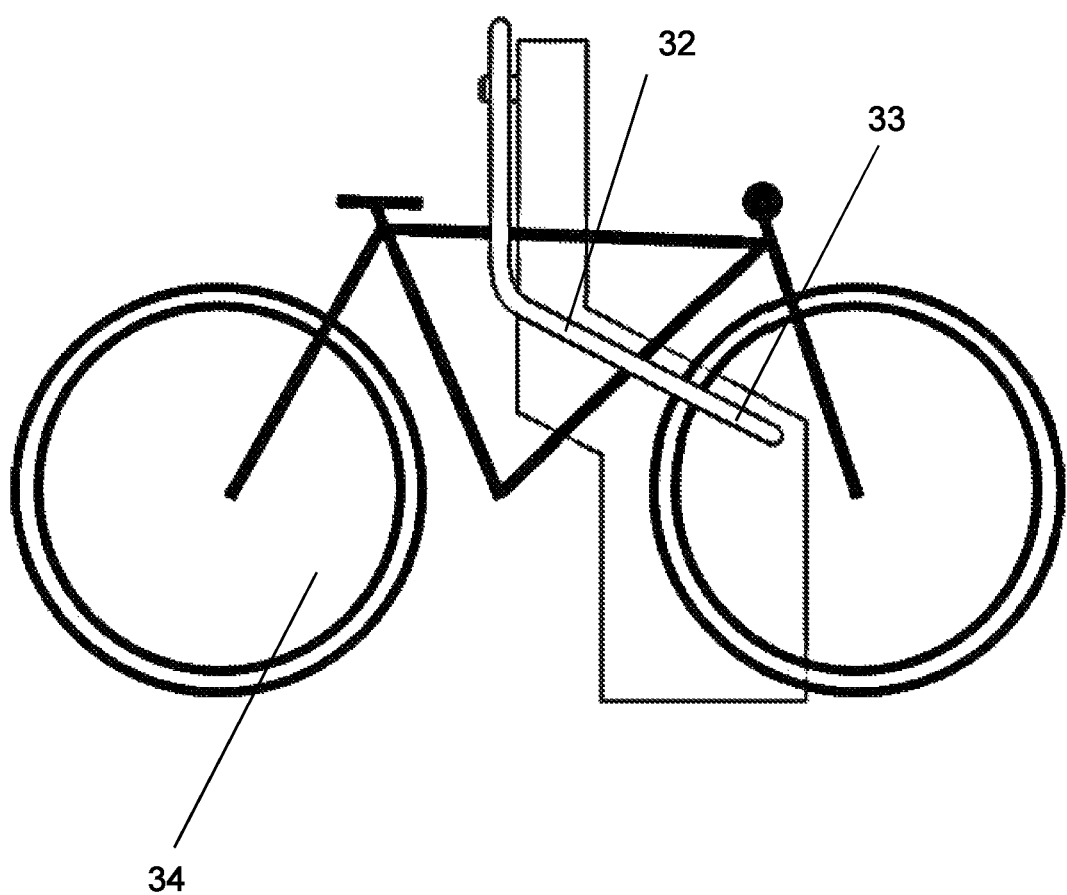
FIG. 8 is a side view of locked bike and the docking unit in closed position.
Figure 9:
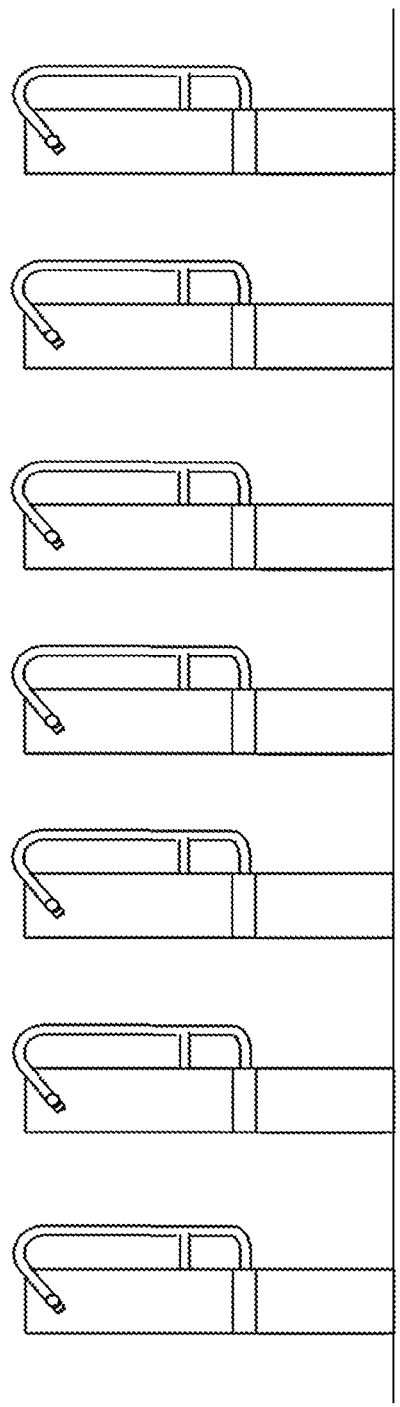
FIG. 9 is a front view of network of docking units.

Referring to FIG. 8, the bike is locked by locking bike's frame and wheel by fixing lever 25 in two fixing points 32, 33.

The first fixing point 32 fixes the bike's frame and the second fixing point 33 fixes the bike's wheel.

The method for bike locking using the present bike locking system provides an easy ergonomic bike locking and comprises following steps. Activating the lock 27 for fixing the lever 25 and the locker door 24 by user identification means 5 (for example with a mobile or an internet application). A notification (for example blinking light and a sound notification, mobile sound instruction, mobile application visual or/and sound indication, locking mechanism mechanical movement sound) indicates an available dock. The on site fixing lever 25 is preferably in an upright opened position, so that bicycle fixing would be carried out easily. Moving the fixing lever 25 to closed position. Moving the fixing lever 25 from one position to another by means of rotary movement to open and/or close the bike lock. Fixing lever 25 is on bearings 26, which provides a smooth rotational movement to securely fix the bicycle. After user activates the lock 27, and moves the fixing lever 25 to a closed position the lever 25 and the locker door 24 are electronically fixed. For user it is not necessary to bend down. This makes the using of system for bike locking more convenient than solutions known in prior art.

The electronic drive that fixes the lever 25 and the locker door 24 is controlled with a microcontroller 19. Each dock 2 has its own microcontroller 19 which are altogether driven by a main unit 1 that handles all the incoming commands. Main unit 1 synchronizes all the data and accepts external commands from a central server 3.

Users can park their bicycles or other vehicles and/or use lockers via web or mobile application, mobile call, SMS or online user interface.

In alternative embodiment according to present method and system for bike locking the user calls to the number provided on the information board. After the call, server will automatically choose a dock, automated answering machine will tell which dock to park in, chosen dock is indicated by a sound beep and a blinking LEDs, placing the bike next to dock, locking securely the frame and the wheel, closing the fixing lever 25, and confirming sound beeping is played.

To release the bike, the user will call the same number, the server will check if the number is in the database and if so, the lever 25 of corresponding bike will open.

Information board comprises instructions for use; terms of use, help desk number for 24 h customer support.

To provide additional security, the present system comprises a battery for the case of power failure. In the alarm situation the lock 27 can be manually opened with a specific key.

The server 3 comprises databases, logging, alarms and notifications of maintenance.

All docking units 2 form a network that is connected to access points via mesh network. Access points are connected to the server 3. The server 3 provides databases, logging, alarms and notifications and information of maintenance, heartbeat, the status of systems, locks, errors, alerts, batteries, activity logs, bookings, and positions of fixing lever 25. All alarm notifications are sent to the maintenance 37, security services 36 and/or service provider 35.

The microcontroller 19 monitors the status of locking modules, whether the lock 27 is activated or not, whether the lock 27 is opened or closed, the errors, alarms, notifications (for example sound and light notifications). In the emergency case the fixing lever 25 is possible to open with special key.

The mobile app, smartphone or web app is connected with the server 3. In alternative embodiment the user inserts the name or location of the locking system and the number of docking unit. The server activates the corresponding docking unit.

In another alternative embodiment to activate the docking unit the QR code is scanned with mobile devices or smartphone or SMS messages is sent to the server. The mobile and web applications provide the parking time and opportunity to end the parking.

The main controller 7 is an alternative embodiment designed to act as local server.

In preferred embodiment the information is directed through the server 3, but in alternative embodiments only main controller 7 is used as server.

The docking units 2 are connected with each other and with main unit 1 by power supply and wired or wireless information bus.

Each docking unit 2 comprises at least one locker for keeping helmet or other personal belongings, keeping electronic devices during the charging period or using it for sending and receiving articles.

The present system and method for bike locking enables also personal bike sharing in preferred and all alternative embodiments. Person or organization, who wants to share their bikes, selects user identification means 5 and appoints when or if at all the bike must be returned (in any cycle parking), determines whether the bicycle sharing service is free or fee based and sets a fee. After the settings are confirmed, the bike for sharing appears visible to the web, mobile application, or is visible from the street or parking lot. Bike sharing takes place through the users' identification means like a bicycle locking/opening.

Each docking unit 2 comprises sensors to alarm the server about vandalize act or theft attempt. The main unit 1 comprises at least one camera to provide additional security.

What is claimed is:

1. A system for bike locking comprising:
    a main unit;
    at least one docking unit;
    a server;
    a local station server; and
    at least one user identification means;
    wherein the local station server is connected to the server and at least one docking unit, and the main unit comprises a first power unit, a main controller, a first communication unit, and a security means,
    wherein the docking unit comprises a housing, a locking module, a second power unit, a charging module, a microcontroller, a second communication unit, alarm means, and communication means,
    wherein the microcontroller is connected to the alarm means and the locking module and the locking module comprises a locker, a locker door, a fixing lever, a bearing and a lock with electronic drive for the fixing lever and the locker door; and
    wherein the second communication unit is connected to the microcontroller, the first communication unit, and the communication means;
    wherein the first power unit is connected to the main controller, to the security means and to the second power unit, the first communication unit is connected to the main controller, to the security means, and over a wired or wireless network with the server;
    wherein the second power unit is connected to the microcontroller and to the charging module.

2. The system according to claim 1, wherein the fixing lever comprises a bended first part, a second part, an end part and a mounting part, wherein the first part, the second part and the end part are bended so that the fixing lever forms an angle of rotation approximately 120-140 degrees and a bike is locked by locking bike's frame by a first fixing point and by locking bike's wheel by a second fixing point and in closed position the mounting part is switched into the lock.

3. The system according to claim 1, wherein the fixing lever is bended.

4. The system according to claim 1, wherein the first power unit comprises a solar panel, battery and/or 110-230V AC connection(s).

5. The system according to claim 1, wherein the user identification means is a manual dock ID input, mobile device, mobile application and/or web application.

6. The system according to claim 1, wherein the local station server is connected via data sync to the server and via service request to at least one identification means and via service request to at least one docking unit.

7. The system according to claim 1, wherein the server is connected to the main unit and a service provider, a security provider, a maintenance service.

8. The system according to claim 1, wherein the main unit comprises the first power unit connected to main controller, which is connected to the first communication unit and security means which is connected to the first communication unit and the first power unit.

9. The system according to claim 1, wherein the communication unit is wireless 2G, 3G connection or Bluetooth connection and/or wired connection.

10. The system according to claim 1, wherein the second communication module is wireless 2G, 3G or Bluetooth connection and/or wired connection.

11. The system according to claim 1, wherein the communication means is RFID, NFC, QR, finger print reader, serial communication read for detecting and communicating with smart bike or other contactless data communication or identification means.

12. The system according to claim 1, wherein the security means is a camera, a piezo sound alarm, SMS notifications for related personnel, cover/case open/close detection, vibration sensors, and/or a dampening sensor.

13. The system according to claim 1, wherein the alarm means comprises alarm sensors, sound and light indicators to indicate a free spot for the bike and buzzer or loudspeaker for alarm.

14. A method for bike locking using the system for bicycle locking according to claim 1 comprising the following steps:
    activating the lock for fixing the lever and the locker door by user identification means;
    notifying the user of an available docking unit;
    placing the bike next to the docking unit;
    locking securely the frame and the wheel of the bike by moving the fixing lever to closed position;
    fixing the lever and the locker door, and
    confirming the secure bike locking.

15. The method according to claim 14, wherein the fixing lever is moved from one position to another by means of rotary movement to open and/or close the bike lock.

* * * * *